United States Patent
Luo et al.

(10) Patent No.: US 12,366,191 B2
(45) Date of Patent: *Jul. 22, 2025

(54) SYSTEMS AND METHODS FOR OPERATING PASSIVE NITROGEN OXIDE ADSORBERS IN EXHAUST AFTERTREATMENT SYSTEMS

(71) Applicant: Cummins Inc., Columbus, IN (US)

(72) Inventors: Jinyong Luo, Columbus, IN (US); Xiaobo Song, Columbus, IN (US); Xing Jin, Columbus, IN (US); David Schmidt, Indianapolis, IN (US); Lu Qiu, Columbus, IN (US); Lisa A Orth-Farrell, Columbus, IN (US); Ying Yuan, Columbus, IN (US); Manik Narula, Columbus, IN (US); Lars K. Henrichsen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/803,329

(22) Filed: Aug. 13, 2024

(65) Prior Publication Data
US 2024/0401512 A1    Dec. 5, 2024

Related U.S. Application Data

(60) Continuation of application No. 18/403,438, filed on Jan. 3, 2024, now Pat. No. 12,085,005, which is a
(Continued)

(51) Int. Cl.
*F01N 3/28* (2006.01)
*B01D 53/02* (2006.01)
(Continued)

(52) U.S. Cl.
CPC .......... *F01N 3/2892* (2013.01); *B01D 53/02* (2013.01); *B01D 53/9418* (2013.01);
(Continued)

(58) Field of Classification Search
CPC .... F01N 3/0814; F01N 3/0842; F01N 3/2066; F01N 3/2803; F01N 3/2892; F01N 9/00;
(Continued)

(56) References Cited

U.S. PATENT DOCUMENTS 7,117,667 B2    10/2006    Mital et al.
7,472,545 B2    1/2009    Hemingway et al.
(Continued)

FOREIGN PATENT DOCUMENTS

CN    110878712 B    1/2021
DE    10 2010 014 468 A1    10/2011
(Continued)

OTHER PUBLICATIONS

Extended European Search Report on EP App. No. 20890112.4 dated Jul. 19, 2023, 8 pages.
(Continued)

*Primary Examiner* — Dapinder Singh
(74) *Attorney, Agent, or Firm* — Foley & Lardner LLP

(57) ABSTRACT

A system includes a passive NOx adsorber (PNA) for receiving and treating exhaust gas generated by an engine and a controller. The controller is configured to: while exhaust gas is received by the PNA, detect a torque demand that is greater than a threshold value; responsive to detecting that the torque demand is greater than the threshold value, engage a motor, coupled with a battery system, with a drive shaft of the system to meet at least a portion of the torque demand; and in response to the engagement of the motor with the drive shaft not meeting all of the torque demand, engage the engine with the drive shaft to meet a remainder of the torque demand.

20 Claims, 7 Drawing Sheets

Related U.S. Application Data division of application No. 17/748,559, filed on May 19, 2022, now Pat. No. 11,898,483, which is a continuation of application No. PCT/US2020/060718, filed on Nov. 16, 2020.

(60) Provisional application No. 62/938,499, filed on Nov. 21, 2019.

(51) Int. Cl.
| | |
|---|---|
| *B01D 53/94* | (2006.01) |
| *F01N 3/08* | (2006.01) |
| *F01N 9/00* | (2006.01) |
| *F02D 29/06* | (2006.01) |

(52) U.S. Cl.
CPC ..... *B01D 53/9431* (2013.01); *B01D 53/9481* (2013.01); *B01D 53/9495* (2013.01); *F01N 3/0842* (2013.01); *F01N 3/2803* (2013.01); *F01N 9/00* (2013.01); *F02D 29/06* (2013.01); *B01D 2253/108* (2013.01); *B01D 2253/112* (2013.01); *B01D 2253/1124* (2013.01); *B01D 2257/404* (2013.01); *B01D 2259/4566* (2013.01); *F01N 2370/04* (2013.01); *F01N 2900/10* (2013.01); *F01N 2900/1602* (2013.01)

(58) Field of Classification Search
CPC .. F01N 11/00; F01N 2370/04; F01N 2410/04; F01N 2550/03; F01N 2560/06; F01N 2590/11; F01N 2900/10; F01N 2900/1602; F01N 2900/1621; B01D 53/02; B01D 53/9418; B01D 53/9422; B01D 53/9431; B01D 53/9481; B01D 53/9495; B01D 2251/2062; B01D 2251/2067; B01D 2253/108; B01D 2253/112; B01D 2253/1124; B01D 2255/1021; B01D 2255/1023; B01D 2255/104; B01D 2255/2065; B01D 2255/50; B01D 2255/91; B01D 2257/404; B01D 2259/4566; F02D 29/06; Y02C 20/10; Y02T 10/12; Y02T 10/40
See application file for complete search history.

(56) References Cited

U.S. PATENT DOCUMENTS

| | | |
|---|---|---|
| 8,037,674 B2 | 10/2011 | Kupe et al. |
| 8,301,358 B2* | 10/2012 | Kurtz .................. F02P 19/021 |
| | | 60/288 |
| 8,327,622 B2 | 12/2012 | Sano et al. |
| 8,713,919 B2 | 5/2014 | Gonze et al. |
| 8,938,948 B2 | 1/2015 | Roberts et al. |
| 8,943,807 B2 | 2/2015 | Andersson et al. |
| 8,978,360 B2 | 3/2015 | Cavataio et al. |
| 9,051,861 B2 | 6/2015 | Linzen et al. |
| 9,677,439 B2 | 6/2017 | Gupta et al. |
| 10,323,594 B2 | 6/2019 | Boerensen et al. |
| 10,690,031 B2 | 6/2020 | Barrientos Betancourt et al. |
| 10,731,587 B2 | 8/2020 | Martin et al. |
| 2008/0296908 A1 | 12/2008 | Utsumi |
| 2009/0008374 A1 | 1/2009 | Fosbinder |
| 2013/0028818 A1 | 1/2013 | Eckhoff et al. |
| 2015/0158019 A1 | 6/2015 | Rajaram et al. |
| 2015/0377102 A1 | 12/2015 | Yezerets et al. |
| 2017/0045004 A1* | 2/2017 | Naidu ................. F02D 41/0007 |
| 2017/0226911 A1 | 8/2017 | Haas et al. |
| 2017/0226970 A1 | 8/2017 | Ford et al. |
| 2018/0010512 A1 | 1/2018 | Kemmerling et al. |
| 2019/0316538 A1* | 10/2019 | Martin .................... F01N 13/10 |
| 2021/0062776 A1* | 3/2021 | Kurtz .................... F02D 41/064 |
| 2022/0275747 A1 | 9/2022 | Luo et al. |

FOREIGN PATENT DOCUMENTS

| | | |
|---|---|---|
| EP | 3 428 415 A1 | 1/2019 |
| WO | WO-2018/183268 A1 | 10/2018 |

OTHER PUBLICATIONS

Final Office Action on U.S. Appl. No. 17/748,559 DTD Jul. 21, 2023.
International Search Report and Written Opinion for PCT Application No. PCT/US2020/060718, dated Apr. 6, 2021, 17 pages.
Non-Final Office Action on U.S. Appl. No. 17/748,559 DTD Mar. 15, 2023.
Notice of Allowance on U.S. Appl. No. 17/748,559 DTD Oct. 3, 2023.
Notice of Allowance on U.S. Appl. No. 18/403,438 DTD May 14, 2024.

* cited by examiner

SYSTEMS AND METHODS FOR OPERATING PASSIVE NITROGEN OXIDE ADSORBERS IN EXHAUST AFTERTREATMENT SYSTEMS

CROSS-REFERENCE TO RELATED APPLICATIONS

This application is a continuation of U.S. patent application Ser. No. 18/403,438, filed Jan. 3, 2024, which is a divisional of U.S. patent application Ser. No. 17/748,559, filed May 19, 2022, which is a continuation of PCT Application No. PCT/US2020/060718, filed Nov. 16, 2020, which claims priority to, and the benefit of the filing date of U.S. Provisional Patent Application No. 62/938,499, filed Nov. 21, 2019, all of which are incorporated herein by reference in their entireties.

TECHNICAL FIELD

The present disclosure relates to internal combustion engine based systems, and in particular to hybrid systems.

BACKGROUND

For internal combustion engines such as, for example, diesel engines, nitrogen oxide (NOx) compounds may be emitted in the exhaust. To reduce NOx emissions, a selective catalytic reduction (SCR) process may be implemented to convert the NOx compounds into more neutral compounds, such as diatomic nitrogen, water, or carbon dioxide, with the aid of a catalyst and a reductant. The catalyst may be included in a catalyst chamber of an exhaust system, such as, for example, that of a vehicle or power generation unit. A reductant, such as anhydrous ammonia, aqueous ammonia, diesel exhaust fluid (DEF), or aqueous urea, is typically introduced into the exhaust gas flow prior to the SCR catalyst. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

In one aspect, a system includes a catalyst for receiving and treating exhaust gas generated by an engine, a passive NOx adsorber (PNA) positioned upstream of the SCR catalyst and fluidly coupled with the catalyst, a bypass valve positioned upstream of the PNA, and a controller. The controller is configured to, determine that an effectiveness of the catalyst in reducing NOx is below a threshold level, in response to determining that the effectiveness of the catalyst in reducing NOx is below the threshold value, control the bypass valve to direct exhaust gas to the PNA. The controller is further configured to, subsequent to controlling the bypass valve to direct exhaust gas to the PNA, determine that the effectiveness of the catalyst is no longer below the threshold level. The controller is further configured to, in response to determining that the effectiveness of the catalyst is no longer below the threshold value, continue to control the bypass valve to direct exhaust gas to the PNA, and after PNA regeneration conditions are met, control the bypass valve to direct exhaust gas to the catalyst bypassing the PNA.

In another aspect, a system includes a catalyst for receiving and treating exhaust gas generated by an engine, a PNA positioned upstream of the catalyst and fluidly coupled with the catalyst, a bypass valve positioned upstream of the catalyst and the PNA, and a controller. The controller is configured to, while controlling the bypass valve to direct exhaust gas to the PNA, detect a torque demand that is greater than a threshold value. The controller is further configured to, responsive to detecting that the torque demand is greater than the threshold value, engage a motor, coupled with a battery system, with a drive shaft of the system to meet at least a portion of the torque demand. The controller is further configured to, in response to the engagement of the motor with the drive shaft not meeting all of the torque demand, engage the engine with the drive shaft to meet a remainder of the torque demand.

In yet another aspect, a method for operating passive nitrogen oxide absorbers (PNA) in an exhaust aftertreatment system includes determining that an effectiveness of a catalyst in reducing NOx is below a threshold level, the catalyst for receiving and treating exhaust gas generated by an engine. In response to determining that the effectiveness of the catalyst in reducing NOx is below the threshold level, the method further includes controlling a bypass valve to direct exhaust gas to the PNA, the PNA positioned upstream of the catalyst and fluidly coupled with the catalyst and the bypass valve positioned upstream of the catalyst and the PNA. Subsequent to controlling the bypass valve to direct exhaust gas to the PNA, the method further includes determining that the effectiveness of the catalyst is no longer below the threshold level. In response to determining that the effectiveness of the catalyst is no longer below the threshold level, the method further includes continuing to control the bypass valve to direct exhaust gas to the PNA, and after PNA regeneration conditions are met, controlling the bypass valve to direct exhaust gas to the catalyst bypassing the PNA

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Figure 1:
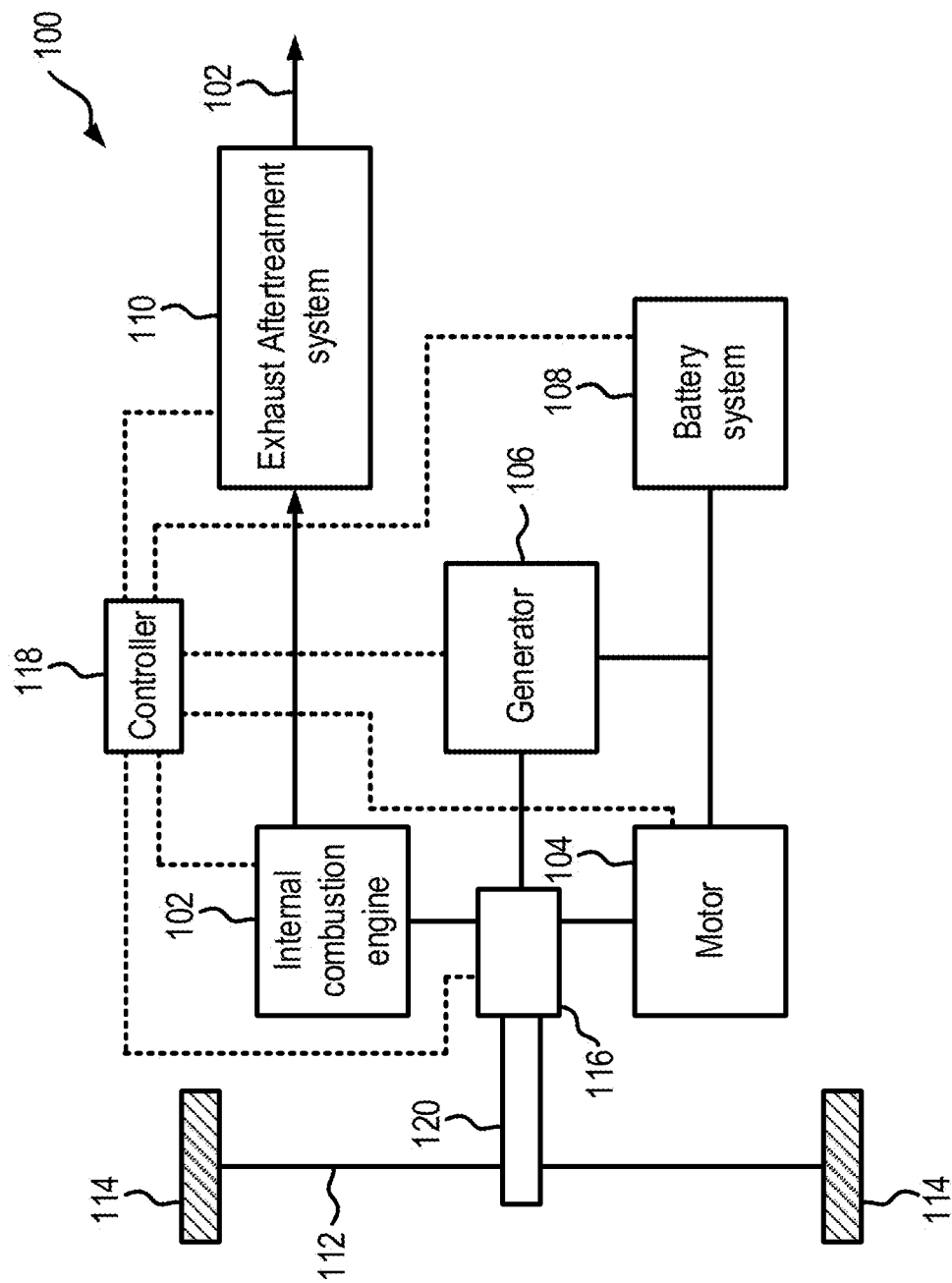
FIG. 1 shows a block diagram of an example vehicle system, according to an embodiment of the present disclosure.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, methods, apparatuses, and systems for exhaust aftertreatment. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Internal combustion engines (e.g., diesel or gasoline internal combustion engines, etc.) produce exhaust gases that are often cleaned within an aftertreatment system. The aftertreatment system can include a decomposition chamber that converts a reductant, such as urea or DEF, into ammonia. The ammonia is mixed with the exhaust and provided to an SCR catalyst. The SCR catalyst is configured to assist the reduction of NOx emissions in the exhaust gas by accelerating a NOx reduction process between the ammonia and the NOx of the exhaust gas into diatomic nitrogen, water, and/or carbon dioxide.

The SCR catalyst operation can be affected by several factors. For example, the effectiveness of the SCR catalyst to reduce the NOx in the exhaust gas can be affected by the operating temperature. If the temperature of the SCR catalyst is below a threshold value, the effectiveness of the SCR catalyst in reducing NOx may be reduced below a threshold level, thereby increasing the risk of high NOx emissions into the environment. The SCR catalyst temperature can be below the threshold temperature under several conditions, such as, for example, during and immediately after engine startup, during cold environmental conditions, etc. In hybrid systems that either use internal combustion engines for charging batteries or to provide power in conjunction with one or more electric motors, the internal combustion engine may start and stop at variable times, increasing the risk of low SCR catalyst temperatures. As a result, when the engine is started, the low temperature of the SCR catalyst can result in high NOx emission levels in the exhaust. While the SCR catalyst temperature could progressively increase once the engine is running after startup, until that time, the exhaust gas can include an undesirable amount of NOx. The effectiveness of the SCR catalyst can also be affected by faults in the SCR catalyst, such as, for example, a lack of reductant or a clogging of the SCR catalyst.

In some instances, PNAs can positioned upstream of the SCR catalyst to adsorb NOx when the effectiveness of the SCR catalyst is below a threshold level. For example, the exhaust gas can be passed through the PNA prior to passing the exhaust gas through the SCR catalyst until the SCR catalyst temperature is at a desired threshold value. Thereafter, the PNA can be bypassed and the exhaust gas can be directed to the SCR catalyst without passing through the PNA.

The PNA includes active adsorption sites, to which NOx is adsorbed. For example, the PNA can include metal ions, such as, palladium, platinum, or silver ions, to which the NOx is adsorbed. Engaging the PNA in the exhaust gas path to adsorb NOx can cause the number of sites for NOx adsorption to reduce over time. Thereafter, the PNA is disengaged when the effectiveness of the SCR catalyst rises above the threshold level. However, when the PNA is reengaged, say for example, when the engine is restarted on a subsequent occasion, the reduction in the number of sites for NOx adsorption reduces the effectiveness of the PNA over time.

In some instances, the effectiveness of the PNA to adsorb NOx may deteriorate under exposure to exhaust gas generated under rich air-fuel mixture conditions. The exposure to rich air-fuel mixture may further deteriorate the ability of the PNA to adsorb NOx at the next cold start.

The systems and methods discussed herein provide solutions to the problems of reduced number of active sites for NOx adsorption and for deterioration of the effectiveness of the PNA in adsorbing NOx due to exposure to exhaust gas generated under rich air-fuel mixture conditions. In some embodiments, the PNA can be regenerated using the exhaust gas after the SCR catalyst has reached a temperature at which the SCR can effectively reduce NOx. In particular, the exhaust gas at or above a particular temperature can be passed through the PNA to desorb the already adsorbed NOx from the active sites, thereby re-exposing those active sites to adsorb NOx when the PNA is reengaged on a subsequent occasion. In some embodiments, the combined operation of the engine and a motor generator of the hybrid system can be controlled to reduce the risk of rich air-fuel mixture conditions during high transient torque demand, thereby reducing the risk of deterioration of the PNA. The discussion below provides solutions to problems discussed above in relation to PNAs used in aftertreatment systems.

FIG. 1 shows a block diagram of a portion of an example hybrid vehicle system 100. The system 100 includes an internal combustion engine 102, an electrical motor 104, a generator 106, a battery system 108, an exhaust aftertreatment system 110, a drive shaft 112 coupled to drive wheels 114, an axle 120, and a drivetrain 116. The engine 102 can be any combustion engine that converts energy generated by combustion of a fuel, such as for example, gasoline, diesel, ethanol, etc., into mechanical energy. For example, the engine 102 can be a heavy-duty internal combustion diesel engine. The motor 104 can be, for example, a series electrical motor. The generator 106 converts mechanical energy into electrical energy, which can be utilized to recharge the battery system 108 or to provide electrical power to the motor 104. The battery system 108 can include rechargeable batteries or capacitive charge storage to store electrical power. The battery system 108 can include additional circuitry that can convert the electrical energy provided by the generator 106 or the motor 104 into suitable voltage and current to charge the batteries or capacitive storage. For example, the battery system 108 can include an inverter that converts alternating voltage and current generated by the generator 106 into direct voltage and current of appropriate magnitudes to recharge the batteries or the capacitive charge storage.

The engine 102 can be mechanically coupled with the generator 106 and the electrical motor 104 via the drivetrain 116. For example, the crank shaft or an output shaft of each of the engine 102, the motor 104 and the generator 106 can be coupled with the drivetrain 116. In some examples, the drivetrain 116 can be a series drive train, in which the drive shaft 112 is driven only by the power delivered from the motor 104. In such instances, the engine 102 can be coupled with the generator 106 (which may also operate as a starter motor) to generate electrical energy to charge the battery system 108 and/or to provide electrical energy to drive the motor 104. In some examples, the drivetrain 116 can be a parallel drivetrain, in which mechanical power generated by both the engine 102 and the motor 104 can be selectively provided to the drive shaft 112. The mechanical power generated by the engine 102 alone, the mechanical power generated by the motor 104 alone, or the combination of the mechanical power generated by the engine 102 and the motor 104 can be selectively provided to the drive shaft 112. In some such examples, the motor 104 can also be used as a generator to charge the battery system 108 by converting mechanical power received from the engine 102 or from the drive shaft 112 during regenerative braking. The drivetrain 116 can include a transmission and one or more clutch mechanism to allow engagement and disengagement of the engine 102, motor 104 and the generator 106 from each other and the drive shaft 112 (and axle 120). The drivetrain 116 can be controlled by the controller 118.

The exhaust aftertreatment system 110 receives exhaust gas from the exhaust manifold of the engine 102 and processes the exhaust gas to remove particulate matter and to reduce the amount of NOx emissions into the environment. The system 100 also includes a controller 118 that controls the operation of at least the above mentioned components of the system 100. The controller 118 can include one or more of a programmable microcontroller or a microprocessor, a logic circuit, a digital/analog circuit, a programmable logic circuit, a field programmable logic gate array, a memory, etc. The controller 118 receives inputs from one or more components in the system 100 and provides control signals to actuate one or more actuators or circuits within the system 100. The controller 118 can be communicably coupled to a memory (volatile or non-volatile), which can store data and instructions that can be executed by the controller 118. In some instances, the data and instructions can be stored in one or more non-volatile computer readable storage mediums, such as, for example, flash drives, compact discs, read-only-memories (ROMs), tape drives, cloud storage, etc.

Figure 2:
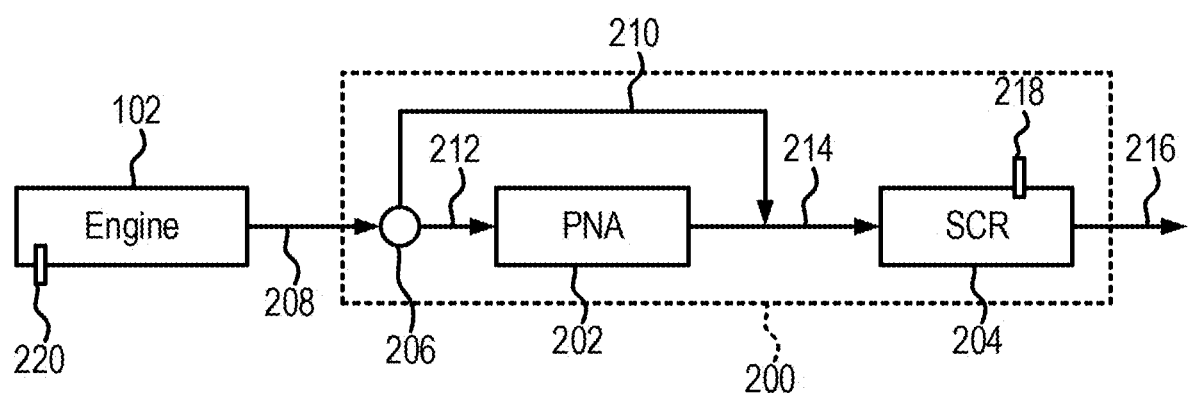
FIG. 2 shows a block diagram showing an internal combustion engine and exhaust aftertreatment system, according to an embodiment of the present disclosure.

FIG. 2 shows a block diagram of an example exhaust aftertreatment system 200 downstream of the engine 102. The exhaust aftertreatment system 200 can be used to implement the exhaust aftertreatment system 110 discussed above in relation to FIG. 1. The exhaust aftertreatment system 200 includes at least a PNA 202, an SCR catalyst 204 and a bypass valve 206. Other components, such as a diesel oxidation catalyst (DOC), a particulate filter (specifically a diesel particulate filter (DPF)), an ammonia slip catalyst (ASC), DEF dosers, mixers, sensors (temperature and NOx) and/or others could be also included at various locations. Exhaust gases from the engine's 102 exhaust manifold are provided to an input conduit 208 of the aftertreatment system 200. The bypass valve 206 is positioned downstream of the exhaust manifold of the engine 102 and the input conduit 208 of the aftertreatment system 200. The bypass valve 206 is a multi-way valve, such as, for example a three-way valve, having at least one input port and at least two output ports. For example, one input port of the bypass valve 206 is coupled with the input conduit 208, one output port of the bypass valve 206 is coupled with a bypass conduit 210 and another output port of the bypass valve 206 is coupled with a PNA conduit 212. The bypass valve 206 can be controlled to selectively direct exhaust gases received at its input port to the bypass conduit 210 or to the PNA conduit 212. For example, in a first position, the bypass valve 206 directs the exhaust gas from the engine 102 to the PNA 202 via the PNA conduit 212, and in a second position, the bypass valve 206 directs the exhaust gas to bypass the PNA 202 via the bypass conduit 210. The bypass valve 206 can include positions in addition to the first and the second positions in which the exhaust gas received at its input port is proportionally output between the PNA conduit 212 and the bypass conduit 210. The bypass valve 206 can be electronically controlled by a bypass valve signal received from a controller, such as the controller 118 shown in FIG. 1.

The PNA 202 is positioned downstream of the bypass valve 206 and the PNA conduit 212 and upstream of a SCR catalyst conduit 214 fluidly coupling the PNA 202 with the SCR catalyst 204. The PNA 202 can include NOx adsorbing elements, such as, for example, palladium, platinum, sliver, zeolite, $Al_2O_3$, $CeO_2$-containing materials, etc., that can adsorb NOx in the exhaust gas. The PNA 202 can receive the exhaust gas produced by the engine 102 and directed to the PNA conduit 212 by the bypass valve 206, adsorb the NOx in the exhaust gas.

The SCR catalyst 204 is configured to assist in the reduction of NOx emissions in the exhaust gas by accelerating a NOx reduction process between a reductant, such as ammonia or urea, and the NOx in the exhaust gas into diatomic nitrogen, water, and/or carbon dioxide. The SCR catalyst 204 is coupled downstream of the engine 102 and the PNA 202. The SCR catalyst 204 can receive exhaust gas from the PNA 202 or from upstream of the PNA 202 via the bypass conduit 210. The output of the SCR catalyst 204 is provided to an output conduit 216, which can connect to other components of the aftertreatment system such as, for example, the ASC, a muffler or a tail pipe.

An SCR catalyst temperature sensor 218 senses the temperature of the SCR catalyst 204. As mentioned above, the effectiveness of the SCR catalyst 204 can be reduced at low temperatures. The SCR catalyst temperature sensor 218 measures the operating temperature of the SCR catalyst 204 and provides the temperature reading to a controller, which can use the measured temperature to identify a cold start. For example, when the engine 102 is started after a long interval, the temperature of the SCR catalyst 204 can be below a threshold value. The controller can compare the measured temperature to a threshold value, and if the temperature is below the threshold value, the controller can determine a cold start. An engine coolant temperature sensor 220 senses the temperature of the coolant of the engine 102 and provides the sensed temperature to the controller. The controller can also consider the engine coolant temperature to determine that a cold start is occurring. For example, the controller can determine a cold start if the engine coolant temperature provided by the engine coolant temperature sensor 220 is below a threshold value. In some examples, the controller can use the temperature reading provided by the SCR catalyst temperature sensor 218 and the temperature reading provided by the engine coolant temperature sensor 220 separately or in combination to determine a cold start. The threshold temperatures to which the controller can compare the received temperature readings can be a function of the particular SCR catalyst used, or the aging state of the SCR catalyst, as different SCR catalysts or aging states can have different effectiveness profiles with respect to temperature.

In some embodiments, a NOx sensor can sense the NOx at the output of the SCR catalyst 204 (such as, for example, at the output conduit 216) to directly measure the effectiveness of the SCR catalyst 204. The NOx sensor can provide a measure of concentration (e.g., in parts-per-million (ppm)) of NOx in the exhaust gas at the output of the SCR catalyst 204. The controller can compare the measurement received from the NOx sensor to a threshold value, and if below the threshold value, determine that the effectiveness of the SCR catalyst 204 to reduce NOx is below a threshold level. The controller can consider a combination of the temperature sensors 218 and 220, and the NOx sensor to determine the effectiveness of the SCR catalyst 204. In some embodiments, additional sensors such as a reductant sensor can determine whether the reductant supplied to the SCR catalyst 204 has been used up, thereby reducing the effectiveness of the SCR catalyst 204 in reducing NOx. That is, the controller can compare the measurement received from the reductant sensor to a threshold value, and if below the threshold value, determine that the effectiveness of the SCR catalyst 204 to reduce NOx is below a threshold level.

Figure 3:
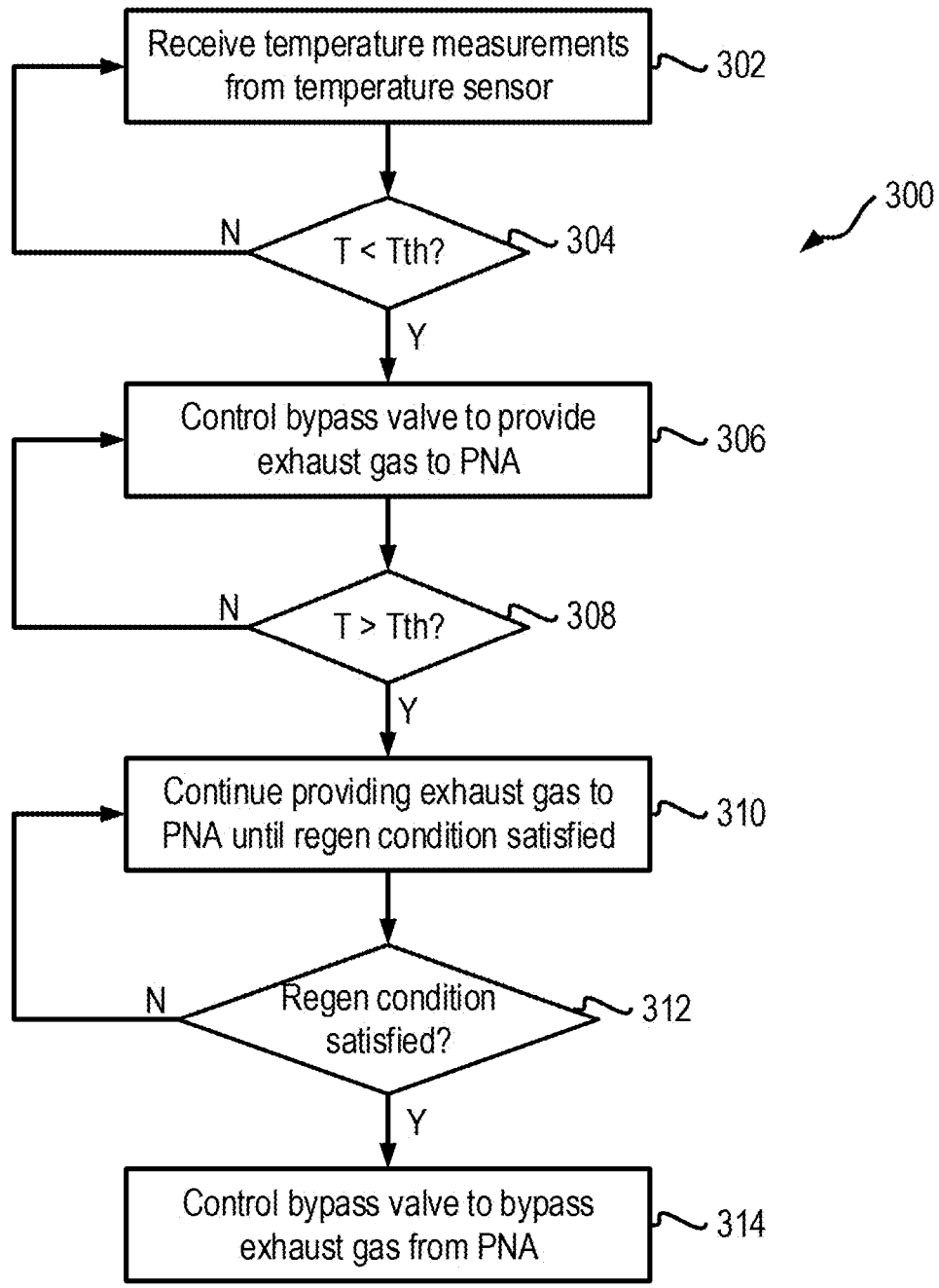
FIG. 3 shows a flow diagram of an example process for controlling a vehicle system shown in FIG. 1.

FIG. 3 shows a flow diagram of an example process 300 for controlling a vehicle system. The controller 118 shown in FIG. 1, for example, can execute the process 300 to control the exhaust aftertreatment system 110 shown in FIG. 1 (or the exhaust aftertreatment system 200 shown in FIG. 2), and various components of the vehicle system 100. The controller 118 can execute the process 300 to determine whether the effectiveness of the SCR catalyst 204 is below a threshold level and control the exhaust aftertreatment system 110 based on the determination. For example, the controller 118 can determine whether the SCR catalyst 204 is operating under cold start conditions, during which the effectiveness of the SCR catalyst 204 to reduce NOx is diminished. While the process 300 focuses on the cold start conditions of the SCR catalyst 204, the process 300 can be readily adapted to determining the effectiveness of the SCR catalyst 204 based on other measurements, such as, for example, the NOx sensors, or the reductant sensor. The process 300 includes receiving temperature measurements from temperature sensors (302). The controller 118 receives temperature measurements from one or more temperature sensors of the vehicle system 100. For example, the controller 118 can receive temperature measurements from the SCR catalyst temperature sensor 218 and/or the engine coolant temperature sensor 220.

The process 300 further includes determining whether the measured temperature is less than a threshold value (304). For example, the controller 118 compares the temperature measurement (T) received from the SCR catalyst temperature sensor 218 to a threshold value (Tth). If the measured temperature is less than the threshold value, the controller 118 can identify a cold start condition. When the engine 102 is started, the exhaust gas from the engine is processed by the SCR catalyst 204 to reduce the NOx in the exhaust gas. Nevertheless, the effectiveness of the SCR catalyst 204 to reduce the amount of NOx in the exhaust gas can be diminished if the SCR catalyst 204 is operating at low temperatures. Cold start conditions can represent conditions that can diminish the effectiveness of the SCR catalyst 204 to reduce NOx in the exhaust gas below a desired level at and after engine startup. A cold start condition can occur, for example, when the temperature of the SCR catalyst 204 is below a certain value. This temperature value can be specific to the type of SCR catalyst 204. As an example, the temperature value can be about 200 degrees Celsius. That is, if the temperature of the SCR catalyst 204 is below 200 degrees Celsius, the effectiveness of the SCR catalyst can diminish below the desired level. The controller 118 can detect a cold start condition by determining that the temperature measurement received from the SCR catalyst temperature sensor 218 is below the predetermined threshold value.

The controller 118 also may consider temperature measurements from alternative or additional locations to determine whether the vehicle system 100 or the SCR catalyst 204 is in a cold start condition. For example, the controller 118 may take into consideration the engine 102 coolant temperature received from the engine coolant temperature sensor 220. Considering additional temperature measurements can reduce the risk of incorrect detection of a cold start. The controller 118 can compare the temperature measurements received from the more than one temperature sensors to their respective threshold values, and based on the outcome determine whether a cold start condition has occurred.

The controller 118 can determine the occurrence of cold start conditions immediately after the engine has been started. The controller 118 may also determine the occurrence of the cold start conditions prior to the engine being started, such as, for example, when the starter motor is activated or when electric power to the vehicle is turned on. Determining a cold start condition prior to starting the engine can allow the controller 118 to configure the system even before the start of the engine to compensate for the lack of NOx capture by the SCR catalyst 204.

Figure 4:
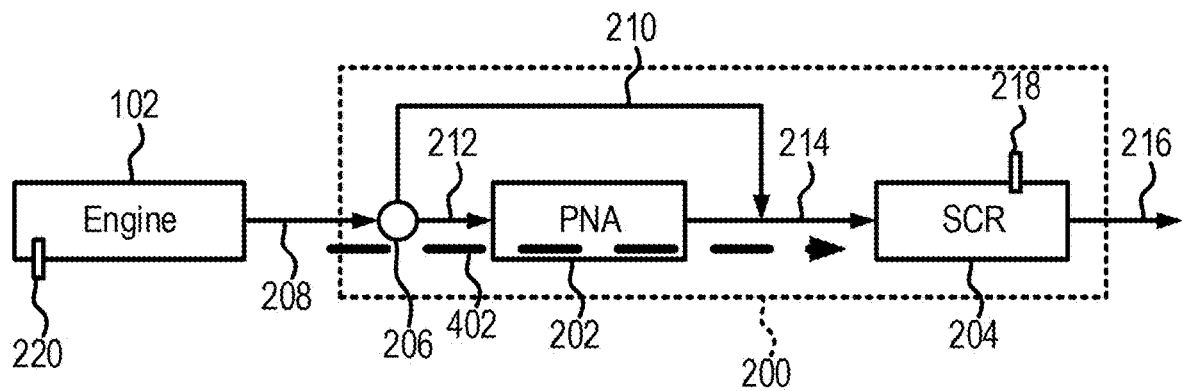
FIG. 4 shows a block diagram of the example internal combustion engine and exhaust aftertreatment system shown in FIG. 2 including a portion of a path of the exhaust gas under cold start conditions.

Upon determining that the vehicle system 100 is operating under cold start conditions, the controller 118 controls the bypass valve 206 such that the exhaust gas received from the engine 102 is directed to the PNA 202 (306). FIG. 4 shows a block diagram of the example exhaust aftertreatment system 200 shown in FIG. 2 including a portion of a path of the exhaust gas under cold start conditions. In particular, FIG. 4 shows a path 402 of the exhaust gas from the engine 102, through the bypass valve 206 and the PNA 202 and to the SCR catalyst 204. The controller 118, upon determining a cold start condition, controls the bypass valve 206 such that the exhaust gas received by the bypass valve 206 via the input conduit 208 is directed to the PNA conduit 212. In some implementations, the controller 118 can control the bypass valve 206 such that no exhaust gas is directed to the bypass conduit 210. In other implementations, the controller 118 may control the bypass valve 206 such that most—but not all—of the exhaust gas (e.g., at least 90% of the exhaust gas) received at the input conduit 208 is directed to the PNA conduit 212.

The PNA 202 compensates for the loss in effectiveness of the SCR catalyst 204 in reducing NOx in the exhaust gas under cold start conditions. The PNA 202 adsorbs NOx that would otherwise have been released into the environment by the SCR catalyst 204 under cold start conditions. The controller 118 monitors the temperature of the SCR catalyst to determine whether the temperature has increased above the threshold value (308). As long as the temperature is below the threshold value, the controller 118 identifies that the vehicle system 100 is still under cold start conditions. Therefore, the controller 118 continues to control the bypass valve 206 to direct the exhaust gas through the PNA 202 before being provided to the SCR catalyst 204. The threshold value with which the controller 118 compares the temperature of the SCR catalyst 204 can be the same as the threshold value used in step 304. With time, the temperature of the SCR catalyst 204 can rise due to exposure to high temperature exhaust gas.

If the controller 118 determines that the temperature of the SCR catalyst 204 is above the threshold value, the controller 118 identifies that the cold start condition has ended. That is, the temperature of the SCR catalyst 204 has reached a level where the SCR catalyst 204 can effectively reduce the NOx in the exhaust gas. The fact that the SCR catalyst 204 is now operating effectively may justify the removing the PNA 202 from the exhaust gas path. However, the controller 118 can continue to direct the exhaust gas through the PNA 202 to regenerate the PNA 202 (310) by affecting desorption of NOx from the PNA 202. During NOx release regeneration process, the PNA 202 is exposed to high temperatures for a prescribed duration to release or desorb the NOx adsorbed therein, thereby increasing the density of active adsorption sites. However, unlike traditional approaches, which utilize separate heaters and pumps to expose the PNA 202 to higher temperatures, the approach discussed herein instead utilizes the exhaust gas itself to provide heat to regenerate the PNA 202. For example, the controller 118, after detecting that the vehicle system 100 is no longer in a cold start condition, continues to maintain the bypass valve 206 in a position that directs the exhaust gas received from the engine 102 towards the PNA 202. The high temperature exhaust gas can provide the heat energy to regenerate the PNA 202 by releasing the stored NOx.

The controller 118 maintains the position of the bypass valve 206, thereby continuing to provide exhaust gas to the PNA 202, until a NOx release regeneration condition is satisfied (312). The regeneration condition can be satisfied when a duration for which the PNA 202 is exposed to the high temperature exhaust gas exceeds a predetermined threshold value. For example, the controller 118 can start a timer after determining an end of the cold start condition, and consider the regeneration condition satisfied when the timer reaches a threshold value. The threshold value can depend upon the type of PNA utilized, and can vary with various implementations of the PNA. In one example, the threshold value can be about one to five minutes. That is, the controller can expose the PNA 202 to high temperature exhaust gas for about one to five minutes after the end of the cold start condition.

In some instances, the regeneration condition can be satisfied when a combination of exhaust gas temperature and duration are satisfied. The PNA 202 regeneration can be a function of both the temperature of the exhaust gas and the duration for which the PNA 202 is exposed to the exhaust gas. If the temperature is increased, the duration of the regeneration process can be reduced, and vice versa. The controller 118 monitors the temperature of the exhaust gas by receiving measurements from one or more temperature sensors positioned along the path of the exhaust gas, such as for example, positioned upstream of the PNA 202, or even from the SCR catalyst temperature sensor 218. The controller 118 then computes the duration of the regeneration process based on the measured temperature. For example, the controller 118 determines the duration based on a formula, or a look up table, that can provide a duration value based on the measured temperature value.

In some instances, the controller 118 operates the engine 102 such that the temperature of the exhaust gas is increased during the regeneration process. In one example, the controller 118 increases the load on the engine 102 by engaging the generator (generator 106, FIG. 1, or motor 104 if the motor is utilized as a generator) with the engine 102. The generator 106 can convert the mechanical power provided by the engine 102 into electrical energy to charge the battery system 108. The increased load on the engine 102 causes an increase in the temperature of the exhaust gas, which can improve the rate of regeneration process of the PNA 202.

Further, the controller 118 can simultaneously regenerate the PNA 202 and charge the battery system 108. Even though the increased load on the engine 102 may result in higher fuel consumption, at least a portion of the mechanical energy generated by the engine 102 is converted to electrical energy and stored in the battery system 108. This stored electrical energy can in turn be utilized to power the motor 104, thereby improving the overall fuel efficiency of the system. By regenerating the PNA 202 immediately after the cold start condition has ended improves the effectiveness of the PNA 202 to adsorb NOx in a subsequent cold start condition.

Figure 5:
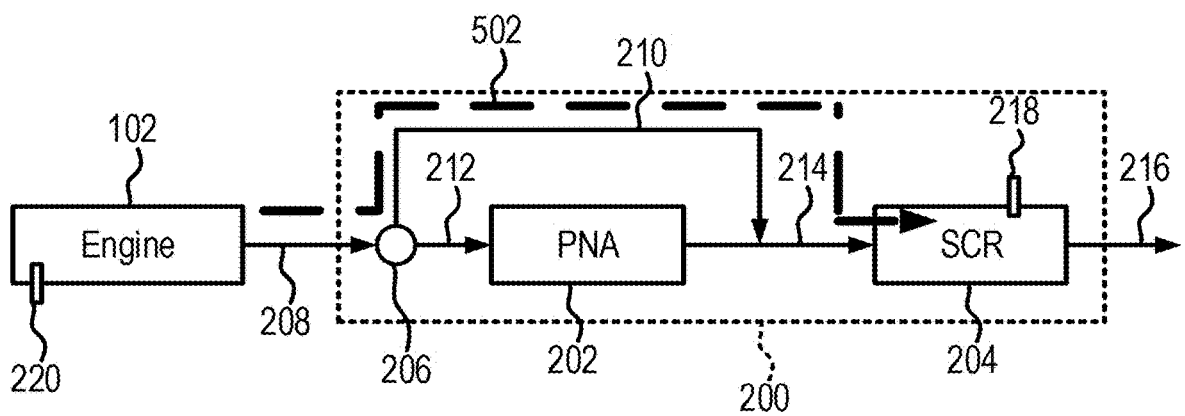
FIG. 5 shows a block diagram of the example internal combustion engine and exhaust aftertreatment system shown in FIG. 2 including a portion of a path of the exhaust gas when not under cold start conditions.

Once the controller 118 determines that the regeneration condition is satisfied, the controller 118 controls the bypass valve 206 to direct the exhaust gas towards the bypass conduit 210, thereby bypassing the PNA 202 (314). FIG. 5 shows a block diagram of the example exhaust aftertreatment system 200 shown in FIG. 2 including a portion of a path 502 of the exhaust gas when not under cold start conditions. The controller 118 controls the bypass valve 206 such that the exhaust gas received via the input conduit 208 is directed to the bypass conduit 210 and towards the SCR catalyst 204, thereby bypassing the PNA 202. As the SCR catalyst 204 is at a temperature where it can effectively reduce the amount of NOx in the exhaust gas, the PNA 202 is not needed. Thus, by removing the PNA 202 from the path of the exhaust gas, the storage capacity of the PNA 202 is maintained, and the PNA 202 can be on standby to again adsorb NOx in the exhaust gas if needed at the next cold start condition.

The controller 118, in addition to controlling the bypass valve 206, can also reduce the load on the engine 102. As discussed above, during the regeneration process of the PNA 202, the controller 118 can increase the load on the engine 102 to increase the temperature of the exhaust gas. Once the regeneration process is over, the controller 118 can remove the load, such as the generator 106 or the motor 104, from the engine 102. In some instances, if the engine 102 is not needed to provide mechanical energy to the drive shaft 112 or electrical energy to the battery system 108, the controller 118 can turn the engine off.

The controller 118, after shutting off the engine 102 may also control the bypass valve 206 into a position that fluidly connects the input conduit 208 with the PNA conduit 212. In this manner, any delay in engaging the PNA 202 in the next cold start condition can be avoided. The controller 118, at the next engine startup, may still detect whether the cold start condition exists based on the temperature measurements from the SCR catalyst temperature sensor 218 and/or the engine coolant temperature sensor 220, and if no cold start condition exists, control the bypass valve 206 to direct the exhaust gas through the bypass conduit 210.

The storage capacity of the PNA 202 may deteriorate also due to exposure to exhaust gas generated from a rich air-fuel mixture. It can be beneficial to avoid the exposure to the rich air-fuel mixture exhaust gas altogether. A rich air-fuel mixture can result from, among other causes, a sudden high transient torque demand placed on the engine 102. For example, the user may turn a throttle (or press an accelerator pedal) of the vehicle system 100 to indicate a desire to increase the speed or velocity of the vehicle. This increase in speed can be viewed as an increase in the torque demand. For example, the controller 118 can translate the change in throttle positions or the change in accelerator pedal positions into changes in torque demand based on the current speed and/or rpm of the engine. Based on the determined torque demand over time, the controller 118 can determine whether the torque demand is high.

Figure 6:
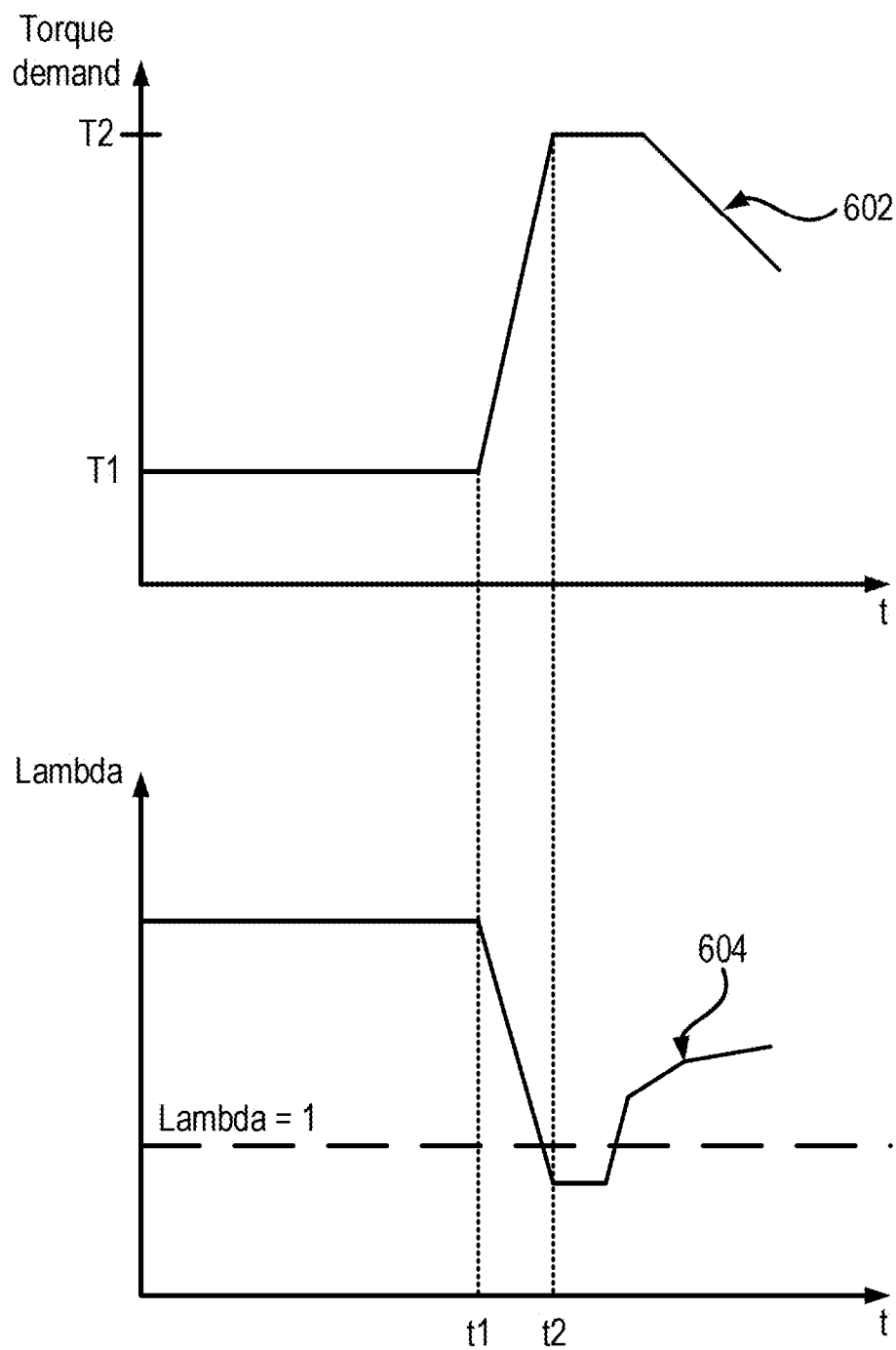
FIG. 6 shows plots of torque demand and lambda for an engine in instances where only the engine is utilized to meet high transient torque demand, according to various embodiments of the present disclosure.

FIG. 6 shows plots of torque demand and lambda for an engine in instances where only the engine is utilized to meet the high transient torque demand. In particular, FIG. 6 shows the torque demand plot 602 and a lambda plot 604 associated with an engine, such as, for example, the engine 102 shown in FIG. 1. The plots in FIG. 6 show how high transient torque demand can result in a rich air-fuel mixture state in the engine 102. The torque demand plot 602 shows the torque demand from a torque value of T1 to a torque value of T2 to be provided to the drive shaft 112 from time t1 to time t2. The lambda plot 604 shows the value of lambda corresponding to the torque demand plot 602 over time when the entire torque demand is satisfied by the engine 102. That is, the torque of the engine 102 will have to follow the torque demand plot 602. The value of lambda in the lambda plot 604 refers to the air-fuel equivalence ratio, which in turn is the ratio of actual air-fuel ratio to stoichiometry for a given mixture. A value of lambda=1 indicates that the actual air-fuel ratio is at stoichiometry. A value of lambda >1 indicates a lean air-fuel mixture, while a value of lambda <1 indicates a rich air-fuel mixture. Rich air-fuel mixture, as mentioned above, can result under high transient torque demands on the engine 102.

Referring again to FIG. 6, before time t1, the torque demand is at a value T1. The controller 118 controls the engine 102 to provide the torque demand. At this time, the engine 102 can run on a lean air-fuel mixture, which results in a value of lambda that is greater than 1. At time t1, the torque demand begins to increase to T2. The increase in torque demand can be met by providing more fuel to the engine, which in turn can lead to a momentary increase the amount of fuel in the engine in relation to the air. As a result, the value of lambda decreases. For high transient torque demands, for example, when the rate of change of the torque demand (e.g., (T2−T1)/(t2−t1)) exceeds a threshold value, the engine 102 may operate under transient conditions that cause the value of lambda to decrease below 1. This indicates that the engine 102 is running on a rich air-fuel mixture. Such transient conditions can result from the high transient torque demand, such as when the user rapidly changes the throttle position.

Running the engine on a rich air-fuel mixture can deteriorate the storage capacity of the PNA 202. The PNA 202 can include dispersed metal ions, such as, for example, palladium ions, which form active sites for adsorption of NOx. But upon exposure to exhaust resulting from rich air-fuel mixture, the metal ions form relatively larger metal particles, resulting in a reduction in the density of active sites for NOx adsorption, and thereby a reduction in the storage capacity of the PNA 202. As discussed below, the controller 118 controls the operation of the vehicle system 100 to reduce the risk of rich air-fuel mixture operation during high transient torque demand.

Figure 7:
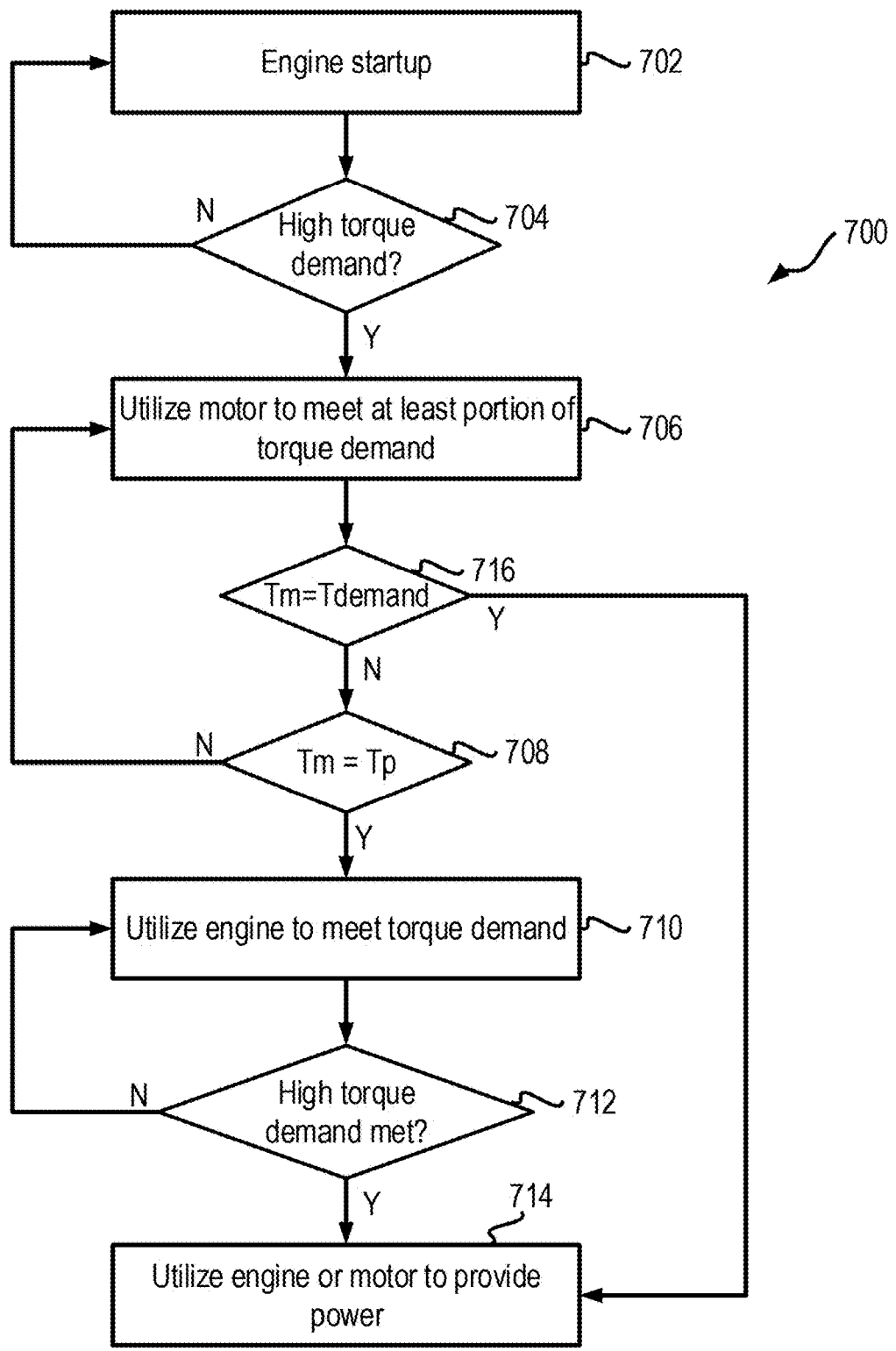
FIG. 7 shows a flow diagram of an example process for operation of the vehicle system under high transient torque demand.

FIG. 7 shows a flow diagram of an example process 700 for operation of the vehicle system under high transient torque demand. In particular, the controller 118 can execute the process 700 to reduce the risk of rich air-fuel mixture operation of the engine 102 during high transient torque demand, and thereby reduce the risk of reduced NOx capacity of the PNA 202. The process 700 includes starting the engine 102 (702). The controller 118 can start the engine 102, for example, under cold start conditions, such as that discussed above in relation to FIGS. 2-5. That is, the controller 118 may start the engine 102 and activate the bypass valve 206 such that the exhaust gas passes through the PNA 202. The controller 118 may also start the engine 102 when no cold start conditions exist, but may still engage the PNA 202 to regenerate the PNA 202. This can occur for example, if the engine was shut off by the user before the completion of the regeneration process of the PNA 202.

The process 700 further includes determining the presence of a high transient torque demand (704). The controller 118 determines high transient torque demand based on the difference between the current torque output of the engine and the torque demand. If the difference is greater than a threshold value, the controller 118 determines a high transient torque demand event. The controller 118 can determine the torque demand based, for example, on the change in throttle position. A throttle position sensor can provide data to the controller 118 indicating the instantaneous throttle positon. The controller 118 can use the data to determine the torque demand. For example, the controller 118 can refer to a look-up-table stored in memory that can include values for current speed, current torque, power demand, and target torque. The controller 118 can use the values for current speed, the current torque, and the power demand to determine the target torque value.

The controller 118 may determine high transient torque demand based on the rate of change in torque demand. For example, the controller 118 can determine the presence of a high torque demand event if a ratio of the difference between the current and the target torque to the time to change the current torque to the target torque exceeds a threshold value. Thus, if the user rapidly changes the throttle position, the rapid change may cause the rate of change of torque demand to be greater than the threshold value, and thereby be determined as being a high transient torque demand event. The high rate of change of torque demand can cause the engine 102 to run rich air-fuel mixture. On the other hand, a gradual rise in the same difference in torque demand may not cause the controller 118 to identify a high transient torque demand, as the gradual rise in the torque demand may not cause the engine 102 to run rich air-fuel mixture, and therefore, may not generate exhaust gas that can deteriorate the PNA 202. The threshold value over which the controller 118 can determine that the rate of change of torque demand constitutes a high transient torque demand can be predetermined and stored in memory. The controller 118 can then compare the determined rate of change of torque demand to the threshold value, and if the rate of change of torque demand is greater than the threshold value, determine that a high transient torque demand condition or event has occurred.

Figure 8:
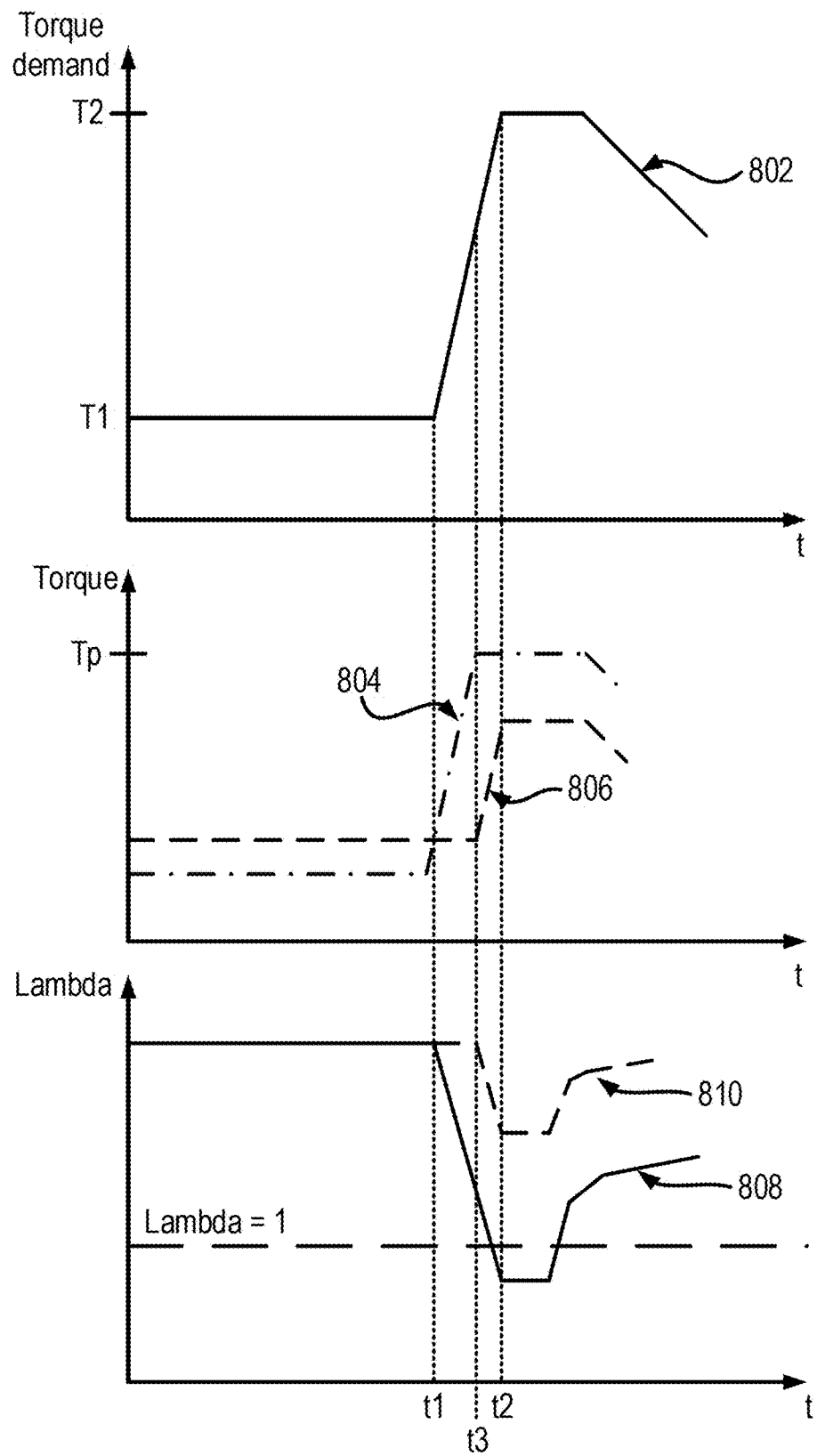
FIG. 8 shows example torque and lambda plots for the vehicle when operating in a power split mode to reduce the risk of rich air-fuel mixture operation.

The process 700 further includes, in response to determining the presence of a high transient torque demand, utilizing the motor 104 to provide at least a portion of the torque demand (706). The controller 118 can utilize the motor 104 to provide at least a portion of the torque demand to mitigate the risk of rich air-fuel mixture operation of the engine 102. FIG. 8 shows example torque and lambda plots for the vehicle when operating in a power split mode to reduce the risk of rich air-fuel mixture operation. In particular, FIG. 8 shows a torque demand plot 802, which is similar to the torque demand plot 602 shown in FIG. 6, a motor torque plot 804, which depicts the torque provided by the motor 104, an engine torque plot 806, which depicts the torque provided by the engine 102, a first lambda plot 808, which is similar to the lambda plot 604 shown in FIG. 6, and a second lambda plot 810 corresponding to the engine torque plot 806. In contrast with FIG. 6, where the controller 118 utilizes only the engine 102 to meet the torque demand, in FIG. 8, the controller 118 utilizes the motor 104 to meet a portion of the torque demand. For example, the controller 118, at time t1, increases the torque output of the motor 104 so that the torque demand from time t1 onwards is met by the motor 104. In particular, the controller 118 can increase the electrical power provided to the motor 104 through the battery system 108 to increase the torque output of the motor 104. Additionally, the controller 118 can control the drivetrain 116 to couple the motor 104 with the drive shaft 112 so that torque generated by the motor 104 is transferred to the drive shaft 112.

The process 700 includes determining whether the motor torque meets the torque demand (716). In particular, the controller 118 can determine whether the increase in the motor torque (Tm) has met the torque demand (Tdemand). If the increase in motor torque has met the torque demand, then the controller 118 may continue using the motor 104 or the engine 102 to provide the torque to the drive shaft 112 (714). The controller 118, having determined that the torque demand has been met by the motor 104, can identify that the high transient torque demand has subsided, and that the vehicle 100 is not in a high transient torque demand state. In some implementations, the controller 118 may switch back to utilizing only the engine 102 to provide the torque to the drive shaft 112. As there is not high transient torque demand, using only the engine 102 to provide torque may not cause the engine 102 to operate in a rich air-fuel mixture state. If the controller 118 determines that the previous increase in the motor 104 torque has met the torque demand, controller 118 can determine whether the torque of the motor 104 has reached a predetermined torque value.

The process 700 includes utilizing the motor 104 provide the torque demand until the torque of the motor 104 reaches a predetermined torque value (708). In particular, the controller 118 can continue to transfer power from the motor 104 to the drive shaft 112 until the motor torque (Tm) reaches a predetermined torque value (Tp). In some examples, the predetermined torque value can be the maximum torque capacity of the motor 104. The predetermined value may be a percentage (e.g., 50%-90%) of the maximum torque capacity of the motor 104. Once the controller 118 determines that the motor torque has reached the predetermined torque value, the motor can engage the engine 102 to meet the torque demand. Referring to FIG. 8, as shown in the motor torque plot 804, the motor torque increases to meet the torque demand from time t1 to time t3, at which time the controller 118 determines that the motor torque has reached the predetermined torque value.

In response to the motor torque reaching the predetermined torque value, but the torque demand not having been met, the engine 102 is utilized to meet the remainder of the torque demand (710). The controller 118, upon determining that the motor torque has reached the predetermined value, can utilize the engine 102 to meet the remainder of the torque demand. For example, the controller 118, at time t3, can control the drivetrain 116 to couple the engine 102 with the drive shaft 112, thereby providing the engine torque to the drive shaft 112.

The process 700 includes continuing to provide the torque from the engine 102 to the drive shaft until the high transient torque demand is met (712). Referring to FIG. 8, the controller 118 can continue to utilize the engine 102 to meet the torque demand until time t3. The increase in the engine torque from time t2 to t3 results in a decrease in the value of lambda, as shown in the second lambda plot 810 in FIG. 8. The decrease in the value of lambda can be a result of increased fuel supplied to the engine, and the resulting decrease in the air-fuel mixture ratio. However, as the magnitude of the torque demand met by the engine 102 is relatively less than that when the engine 102 alone is utilized to meet the entire torque demand, the value of lambda does not decrease below the value of 1. Therefore, the engine 102 runs on a relatively lean air-fuel mixture throughout the duration that it provides torque to meet the high transient torque demand. As a result, the risk of the exhaust gas produced by the engine 102 deteriorating the storage capacity of the PNA 202 is also reduced. By utilizing the motor 104 to meet at least a portion of the high transient torque demand, the risk of the value of lambda falling below 1 is reduced. After the high transient torque demand is met, the controller 118 can continue to utilize the engine 102, the motor 104, or both, to provide power to the drive shaft 112 (at 714).

In the example discussed above in relation to FIGS. 7-8, the motor 104 is utilized first to provide torque in response to high transient torque demand. In some other examples, the motor 104 can be utilized anywhere during the period of high transient torque demand. For example, the controller 118 can utilize the engine 102 to meet the high transient torque demand first for a duration, and engage the motor 104 to provide the remainder of the high transient torque demand after the duration. The controller 118 can select the duration to be short enough to ensure that the value of lambda does not decrease below the value of 1. The controller 118 may also alternate between the engine 102 and the motor 104 throughout the duration of the high transient torque demand to ensure that the value of lambda does not decrease below the value of 1.

It should be understood that the solutions discussed above are not limited to vehicle systems, and can be applied to any system that includes an engine and an aftertreatment system or additionally includes a motor-generator.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:
1. A system comprising:
a passive NOx adsorber (PNA) for receiving and treating exhaust gas generated by an engine; and
a controller configured to:
while exhaust gas is received by the PNA, detect a torque demand that is greater than a threshold value;
responsive to detecting that the torque demand is greater than the threshold value, engage a motor, coupled with a battery system, with a drive shaft of the system to meet at least a portion of the torque demand; and
in response to the engagement of the motor with the drive shaft not meeting all of the torque demand, engage the engine with the drive shaft to meet a remainder of the torque demand.

2. The system of claim 1, wherein the engine is engaged with the drive shaft in response to determining that the motor has reached a predefined torque capacity that is less than the torque demand.

3. The system of claim 1, wherein the controller is further configured to translate a change in at least one throttle position into at least one change in torque demand based on a current speed of the engine, and wherein a throttle position sensor provides data to the controller indicating the throttle position.

4. The system of claim 1, wherein the controller is further configured to determine a presence of a high torque demand event in response to a ratio of a difference between a current torque and a target torque to a time to change the current torque to the target torque exceeding a threshold value.

5. The system of claim 4, wherein determining the target torque is based on at least one of a current engine speed, the current torque, or a power demand.

6. The system of claim 4, wherein the controller is further configured to alternate between engaging the engine and engaging the motor during the high torque demand event to prevent a rich air-fuel mixture.

7. The system of claim 1, wherein engaging the motor with the drive shaft of the system to meet the at least the portion of the torque demand comprises increasing electrical power provided to the motor from the battery system.

8. A method comprising:
while exhaust gas is received by a passive NOx adsorber (PNA), detecting a torque demand of an engine that is greater than a threshold value;
responsive to detecting that the torque demand is greater than the threshold value, engaging a motor coupled to a battery system with a drive shaft to meet at least a portion of the torque demand; and
in response to the engagement of the motor with the drive shaft resulting in less than the torque demand being met, engaging the engine with the drive shaft to meet at least a portion of a remainder of the torque demand.

9. The method of claim 8, wherein the engine is engaged with the drive shaft in response to determining that the motor has reached a predefined torque capacity that is less than the torque demand.

10. The method of claim 8, further comprising translating a change in at least one throttle position into at least one change in torque demand based on a current speed of the engine.

11. The method of claim 10, further comprising receiving data from a throttle position sensor regarding the at least one throttle position.

12. The method of claim 8, further comprising determining a presence of a high torque demand event in response to a ratio of a difference between a current torque and a target torque relative to a time to change the current torque to the target torque exceeding a threshold value.

13. The method of claim 12, wherein determining the target torque is based on at least one of a current engine speed, the current torque, or a power demand.

14. The method of claim 12, further comprising alternating between engaging the engine and engaging the motor during the high torque demand event.

15. The method of claim 8, wherein engaging the motor with the drive shaft of the system to meet the at least the portion of the torque demand comprises increasing electrical power provided to the motor from the battery system.

16. A system comprising:

a controller configured to:
- determine that an effectiveness of a catalyst in reducing NOx is below a threshold level;
- in response to determining that the effectiveness of the catalyst in reducing NOx is below the threshold level, control a valve to direct exhaust gas to a passive NOx adsorber (PNA);
- subsequent to controlling the valve to direct exhaust gas to the PNA, determine that the effectiveness of the catalyst is no longer below the threshold level; and
- in response to determining that the effectiveness of the catalyst is no longer below the threshold level, continue to control the valve to direct exhaust gas to the PNA for a predetermined duration and increase a load on the engine by mechanically engaging a generator with the engine, and utilize resulting electrical energy generated by the generator to charge a battery system.

17. The system of claim 16, wherein after a PNA regeneration condition is met upon an elapse of the predetermined duration, the controller is further configured to control the valve to direct exhaust gas to the catalyst bypassing the PNA.

18. The system of claim 17, wherein the PNA regeneration condition is met upon a combination of the elapse of the predetermined duration for which exhaust gas is directed to the PNA and an exhaust gas temperature.

19. The system of claim 16, wherein the controller is further configured to adjust the valve such that exhaust gas received at an input port is output only to a PNA conduit and not a bypass conduit.

20. The system of claim 16, wherein the effectiveness of the catalyst in reducing NOx is determined to be below the threshold level based on one or more of a determination that a temperature of the catalyst is below a first threshold value or a NOx value at an output of the catalyst is below a first threshold value.

* * * * *